United States Patent
Ghosh et al.

(10) Patent No.: US 7,824,129 B2
(45) Date of Patent: Nov. 2, 2010

(54) LOW-IMPACT DELIVERY SYSTEM FOR IN SITU TREATMENT OF CONTAMINATED SEDIMENT

(75) Inventors: Upal Ghosh, Ellicott City, MD (US); Charles A. Menzie, Severna Park, MD (US); Craig B. Amos, Westford, MA (US)

(73) Assignees: Menzie-Cura & Associates, Inc., Severna Park, MD (US); University of Maryland, Baltimore County, Baltimore, MD (US)

( * ) Notice: Subject to any disclaimer, the term of this patent is extended or adjusted under 35 U.S.C. 154(b) by 422 days.

(21) Appl. No.: 11/873,835

(22) Filed: Oct. 17, 2007

(65) Prior Publication Data

US 2009/0103983 A1    Apr. 23, 2009

Related U.S. Application Data

(60) Provisional application No. 60/852,628, filed on Oct. 18, 2006.

(51) Int. Cl.
*B09C 1/00* (2006.01)
(52) U.S. Cl. .................................. 405/128.1
(58) Field of Classification Search ............... 405/128.1, 405/128.15, 128.45, 128.5, 128.7, 128.75
See application file for complete search history.

(56) References Cited

U.S. PATENT DOCUMENTS

| | | | |
|---|---|---|---|
| 3,892,661 | A | 7/1975 | Siviour et al. |
| 4,134,831 | A | 1/1979 | Dawson et al. |
| 4,677,086 | A | 6/1987 | McCue et al. |
| 5,387,343 | A | 2/1995 | Iwai et al. |
| 5,460,744 | A | 10/1995 | Iwai et al. |
| 5,538,787 | A * | 7/1996 | Nachtman et al. ........... 405/268 |
| 5,897,946 | A | 4/1999 | Nachtman et al. |
| 6,350,380 | B1 | 2/2002 | Harrington |
| 6,386,796 | B1 | 5/2002 | Hull |

(Continued)

FOREIGN PATENT DOCUMENTS

DE        4416030 A1    11/1995

(Continued)

OTHER PUBLICATIONS

Venkatesh, S; Fournier, Jr., DJ; Waterland, LR; Carroll, GJ, Evaluation of mineral-based and additives as sorbents for hazardous trace metal capture and immobilization in incineration processes. Hazardous Waste & Hazardous Materials, 13, 73-94.

(Continued)

*Primary Examiner*—John Kreck
(74) *Attorney, Agent, or Firm*—Husch Blackwell LLP; Robert C. Haldiman

(57) ABSTRACT

An agglomerate for use in economical bulk treatment of contaminated sediments with minimal environmental impact is formed from a sorbent, bentonite clay and sand. The agglomerate has sufficient density so as to sink through a water column into sediment below the water column and is still sufficiently light as to be capable of mixing with the sediment when subjected only to bioturbation. The agglomerate can be formed into pellets and applied to a water column over contaminated sediment by broadcast methods, so as to permit economical remediation of contaminated sediment with negligible environmental impact.

31 Claims, 7 Drawing Sheets

U.S. PATENT DOCUMENTS

| | | | |
|---|---|---|---|
| 6,403,364 B1* | 6/2002 | Hince | 435/262.5 |
| 6,472,343 B1 | 10/2002 | McCrae et al. | |
| 6,558,081 B2* | 5/2003 | Hull | 405/157 |
| 6,573,212 B2 | 6/2003 | McCrae et al. | |
| 6,696,384 B2 | 2/2004 | McCrae et al. | |
| 7,011,756 B2 | 3/2006 | Harrington | |
| 7,011,766 B1 | 3/2006 | Hull | |
| 7,101,115 B2 | 9/2006 | Luthy et al. | |
| 2003/0092583 A1* | 5/2003 | Luthy et al. | 507/200 |
| 2004/0132869 A1 | 7/2004 | Peppmoller et al. | |
| 2006/0000767 A1 | 1/2006 | Trauger et al. | |
| 2006/0030476 A1 | 2/2006 | Lovell et al. | |
| 2006/0144798 A1 | 7/2006 | Dixon et al. | |

FOREIGN PATENT DOCUMENTS

| | | | |
|---|---|---|---|
| JP | 63116727 A | 5/1988 | |

OTHER PUBLICATIONS

Apak, R; Tuetem, E; Hueguel, M; Hizal. Heavy metal cation retention by unconventional sorbents (red muds and fly ashes) J, Water Research. 32, 430-440, 1998.

Cao, X; Ma, L.Q.; Chen, M.; Singh, S.P.; Harris, W.G. Impacts of Phosphase Amendments on Lead Biogeochemistry at a Contaminated Site, Eviron. Sci. Technol, 36, 5296-5304, 2002.

Ghosh, U., R.G. Luthy, J.S. Gillette, R.Z. Zare. 2000. Microscale Location, Characterization, and Association of Polycyclic Aromatic Hydrocarbons on Harbor Sediment Particles. Environ. Sci. & Technol. 34, 1729-1736.

Ghosh, U. R.G. Zimmerman, R.G. Luthy. 2003. PCB and PAH Speciation Among Particle Types in contaminated Sediments and Effects on PAH Bioavailability. Environ. Sci. & Technol. 37, 2209-2217.

Ghosh, J., J.R. Zimmerman, P.B. McLeod, R.G. Luthy, R.N. Milward, T.S. Bridges. Microscale Association of Organic Contaminants to Sediment Particles and Implications for Risk Management. Physicochemical Processes in Environmental Systems: symposium in Honor of Prof. Walter J.Weber, Jr. American Chemical Society, New York, NY. Sep. 7-11, 2003.

Millward, R.N., T.S. Bridges, U.Ghosh, J.R. Zimmerman, R.G. Luthy. Addition of Activated Carbon to Sediments to Reduce PCB Bioaccumulation by a Polychaete (*Neanthes arenaceodentata*) and an Amphipod (*Leptocheirus plumulosus*). Environ. Sci. & Technol. 39, 2880-2887, 2005.

National Research Council of the National Academies (NRC). 2001. A risk-management strategy for PCB-contaminated sediments: The National Academy Press, Washington, DC.

Southerland, E 2004. Results of EPA's Remedy Effectiveness Study. Presented at USACE/USEPA/USWAG Joint Sediment Conference. Oct. 26-28, 2004, St. Louis, MO.

United States Environmental Protection Agency (USEPA). 2005. Contaminated Sediment Remediation Guidance for Hazardous Waste Sites. Jan. 2005 Peer Review Document.

Zimmerman, J.R., U.Ghosh, R.G. Luthy, R.N. Millward, T.S. Bridges. Addition of carbon sorbents to reduce PCB and PAH bioavailability in marine sediments. Physicochemical tests. Environ. Sci. & Technol. , 38, 5458-5664.

UEPA (2000) Methods for Measuring the Toxicity and Bioaccumulation of Sediment-Associated Contaminants with Freshwater Invertebrates, US EPA 600/R-99/064, Mar. 2000.

Sun,X., Ghosh, U., PCB Bioavailability Control in Lumbriculus Variegatus through Different Modes of Activated Carbon Addition to Sediments; Environ. Sci. Technol, 2007, 41, 4774-4780.

International Preliminary Report on Patentability (IPER), App No. PCT/US2007/081638 (Apr. 22, 2009).

Search Report, App. No. PCT/US2007/081638 (May 27, 2008).

\* cited by examiner

LOW-IMPACT DELIVERY SYSTEM FOR IN SITU TREATMENT OF CONTAMINATED SEDIMENT

CROSS-REFERENCE TO RELATED APPLICATIONS

This application claims the benefit of U.S. Provisional Patent Application No. 60/852,628, filed Oct. 18, 2006.

STATEMENT REGARDING FEDERALLY SPONSORED RESEARCH

This invention was supported in part by government funding awarded by the Department of Defense and the United States Environmental Protective Agency, specifically contract numbers W912HG-06-C0022, and EP-D-06-029. The U.S. Government has certain rights in this invention.

APPENDIX

Not Applicable.

BACKGROUND OF THE INVENTION

Field of the Invention

The present invention relates generally to the field of cleanup of contaminated bodies of water, and, more particularly, to a delivery system for treatment of contaminated underwater sediment in situ, having low impact on the benthic community.

To date, the most commonly considered alternatives for contaminated sediment management are (1) dredging and placement in confined disposal facilities (CDFs) or hazardous waste landfills and (2) capping, an option for containment in engineered subaqueous sites. However, either option is expensive and requires large-scale material handling and long-term management. In addition, dredging operations can cause temporary high levels of contaminants in the water column (the water overlying the sediment in a lake, harbor, river, or other water body) and surficial sediments due to re-suspension of buried contaminated sediments and release of pore water. Further, all known sediment treatment technologies will leave residual contaminants. Innovative engineering solutions to the problem of persistent organic contaminants in aquatic food webs require rethinking of the existing remediation paradigm of "dredge-and-landfill." Although several researchers have found promising amendment materials for sequestration of organic and metal contaminants in sediments, to be successful the practical application of these approaches in the field require low-cost and low-impact delivery approaches.

SUMMARY OF THE INVENTION

This disclosure describes the development of a novel, low-impact approach for the delivery of treatment amendments for contaminated sediments. Unlike available delivery systems that rely on injection or mechanical mixing of the sediment, the low-cost and low-impact delivery system makes use of material engineering aided by natural mixing (bioturbation) processes to work treatment materials into the biologically active sediment zone. An advantage of the low-impact delivery system found over conventional systems is that it targets the biologically active zone where the benthic organisms reside, and is less destructive of benthic habitats (the body of organisms living at the bottom of a body of water).

Research for the present invention demonstrates that agglomerates with the desired characteristics can be produced and has shown that the treatment material can be distributed through the biologically active zone in days to weeks, where benthic communities are established. Because the present delivery system depends on natural mixing processes, the application of the technology requires biological assessment of the sediment in order to judge efficacy and to estimate loading rates.

The agglomerate disclosed herein represents the first delivery method for remedial materials to sediment that does not require mechanical mixing into sediment. The technology is applicable in areas where the application of current in situ treatment practices are problematic and expensive, such as in deep water, in vegetated areas, in sensitive wetlands, or over very large areas. The agglomerates can be designed to carry a number of remedial materials to sediment, allowing for in situ treatment of a variety of contaminants.

While the sediments and benthic organisms used in the model systems in this study are representative of the Chesapeake Bay coastal sediments and Grasse River sediments, the treatment materials that have been developed have wide application to myriad freshwater environments (e.g. lake Hartwell, Hudson River, Great Lakes Areas of Concern) as well as marine estuarine/marine systems (e.g. Hunters point in San Francisco Bay or the Patapsco River and Baltimore Harbor in Maryland). Application methods that can be considered at a conceptual level include, but are not limited to, a barge-mounted broadcast-type fertilizer spreader and other methods such as some of those currently employed for thin-layer capping.

A primary element of the present system is the novel approach to cost-effective delivery of sediment amendments and utilization of natural processes to achieve mixing of the treatment amendments in the bioactive zone in sediments. A further new element of the invention is the manipulation of material properties of the new amendment pellets (or "particles") to achieve surprisingly efficient delivery through a water column and controlled breakdown of the amendments while maintaining effectiveness in sediment remediation.

Historically, the most commonly considered alternatives for contaminate sediment management are (1) dredging and placement of large volumes of removed sediment in confined disposal facilities (CDFs) or hazardous waste landfills and (2) capping, an option for containment in engineered subaqueous sites. Removal options such as dredging and excavation have certain clear advantages, especially in situations where hot spots exist and there is a desire to reduce sources and risks quickly and to insure a permanent solution. However, the limitations and disadvantages of these methods have also become better understood. In particular, the issues of re-suspension of contaminants, residual contamination, and the destruction of benthic habitat are concerns that arise when removal technologies are considered. In situ treatment of sediments can help address the presence of residual contamination and, as proposed here, can be targeted at the surficial sediment layer of interest, and implemented in a way that minimizes impact on native benthic and associated fish and wildlife communities.

In situ treatment of contaminated sediment can be an especially attractive alternative for low or moderately contaminated sites. This new alternative can be used by itself or in combination with other methods. Remedial strategies that combine methods are expected to become more common. For example, in situ treatment could be part of a capping technology, could be used to manage residual contaminants after dredging, or could be used to enhance Monitored Natural Recover (MNR) processes. Being able to deliver in situ treatment in a low-impact (little negative effect) manner opens the possibility of using this technology to address more sensitive areas (for example where there are sea grass beds or a valued invertebrate prey base for fish and wildlife) and larger areas.

Accordingly, in keeping with the description herein the present invention is an agglomerate for use in economical bulk treatment of contaminated sediments with minimal environmental impact. The agglomerate is formed from a sorbent, such as powdered activated carbon, for example, bentonite clay and sand. The agglomerate has sufficient density so as to sink through a water column into sediment below the water column and is still sufficiently soft upon wetting as to be capable of mixing with the sediment when subjected only to bioturbation. The agglomerate can be formed into pellets and applied to a water column over contaminated sediment by broadcast methods, so as to permit economical remediation of contaminated sediment with negligible environmental impact.

The invention is further, briefly, a low-impact method of remediating contaminated sediments including the steps of a) providing an agglomerate formed of a sorbent, bentonite and sand and having sufficient weight so as to sink through a water column into sediment below the water column and still be sufficiently soft upon wetting as to be capable of mixing with the sediment when subjected only to bioturbation; b) applying the agglomerate to the surface of a water column having contaminated sediment there under; and c) permitting the agglomerate to sink through the water column and be subject to bioturbation; thereby economically decontaminating sediment with low impact on the benthic community in the sediment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
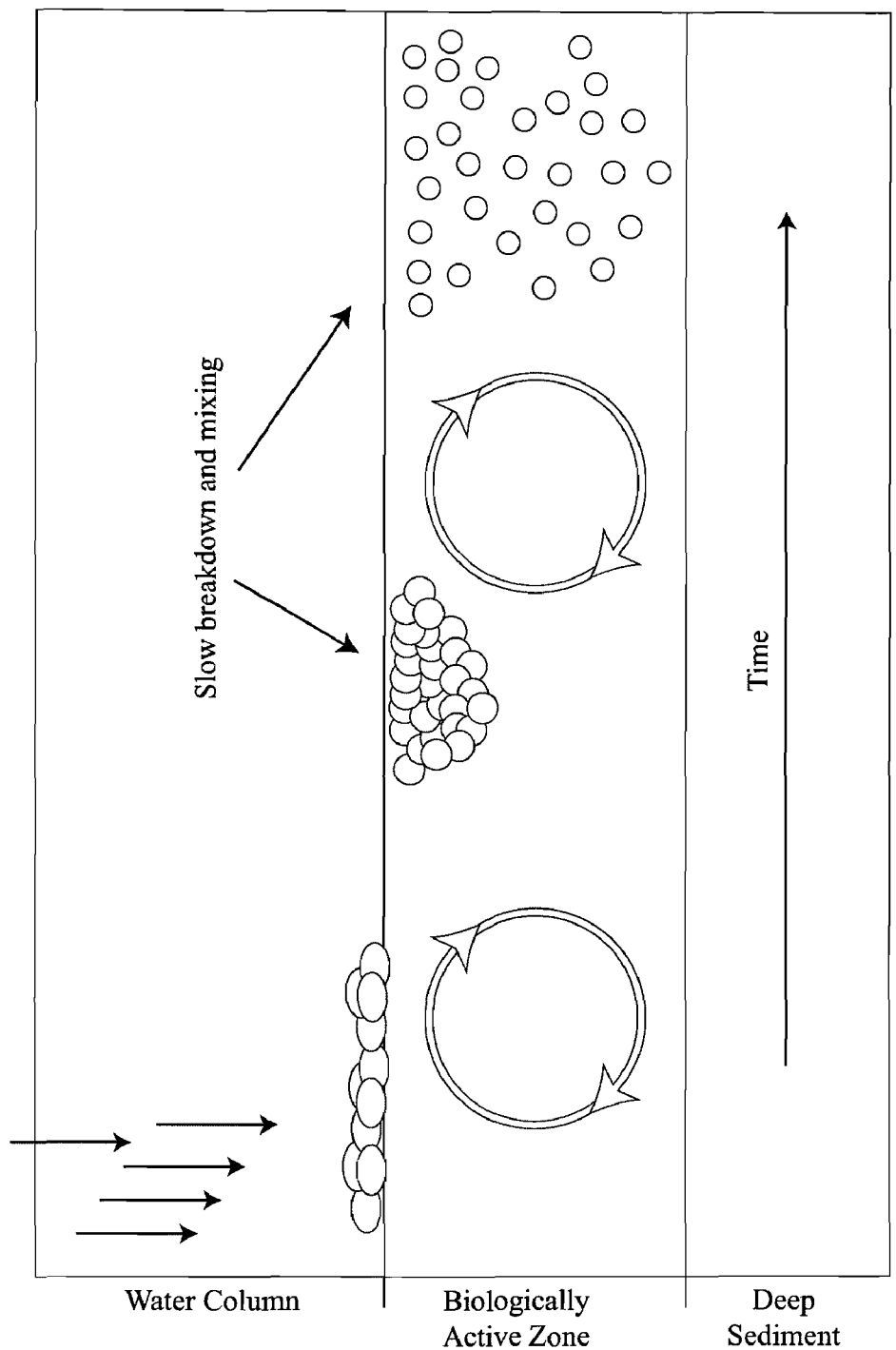
FIG. 1 is a schematic diagram of a delivery system constructed in accordance with and embodying the present invention illustrating the application of tailored agglomerates that slowly break down and are incorporated into the biologically active zone of the treated sediment.

The present low-impact delivery system delivers treatment materials directly to the water column and forgoes the more expensive alternative of mechanical mixing and/or injection. Instead, the technology relies on natural biomixing (bioturbation) processes mix treatment agents into the biologically active zone as shown conceptually in FIG. 1. The technology relies on "packaging" and delivering the treatment agent within a dense granule that is able to resist re-suspension and that would be worked into the sediment by the organisms. Many of the in situ treatment agents currently being evaluated for sediments (e.g., activated carbon particles) do not have the desired properties to be delivered directly from the water column. This research involved developing and testing various agglomerates with the following properties: dense enough to sink through the water column and provide a light non-suffocating layer on the sediment, dense enough to be resistant to re-suspension over the period it takes to be worked into the sediments, and able to break down to release active agents over the period of weeks to months. In addition, the binders used for the agglomerate must have negligible toxicity. The clear advantages of this over conventional systems are that it targets the biologically active zone where the benthic organisms reside, is less destructive of benthic habitats, and can be used to augment removal and monitored natural restoration projects. Further, because the delivery system is relatively straight forward and has low environmental impact, applications can be repeated, as needed over time.

Figure 2B:
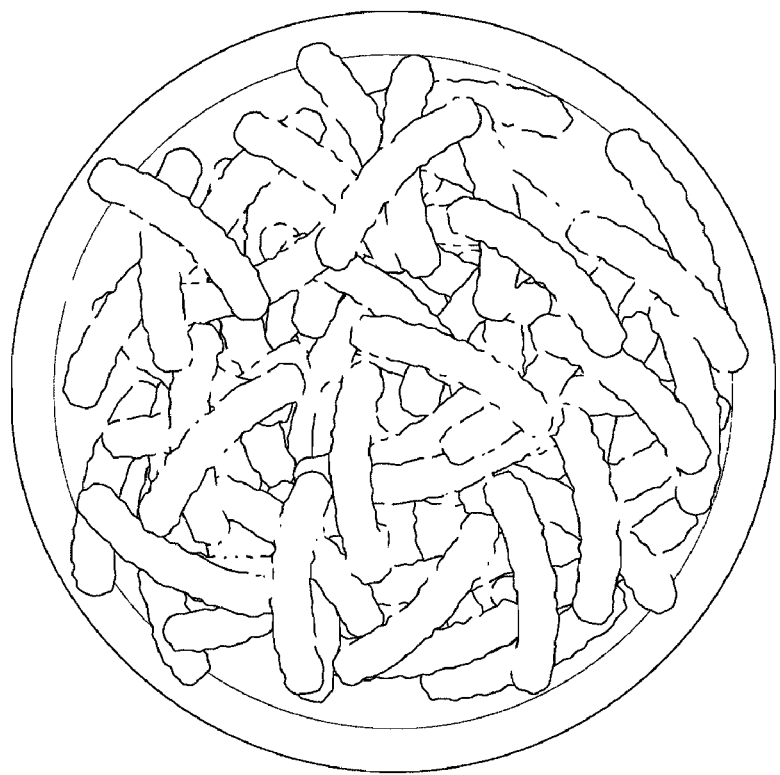
FIG. 2 is a photograph showing samples of produced agglomerates: a) 55% powdered activated carbon, 25% bentonite, 15% sand, 5% cellulose; and b) 60% powdered activated carbon, 20% bentonite, and 20% sand.
Figure 2A:
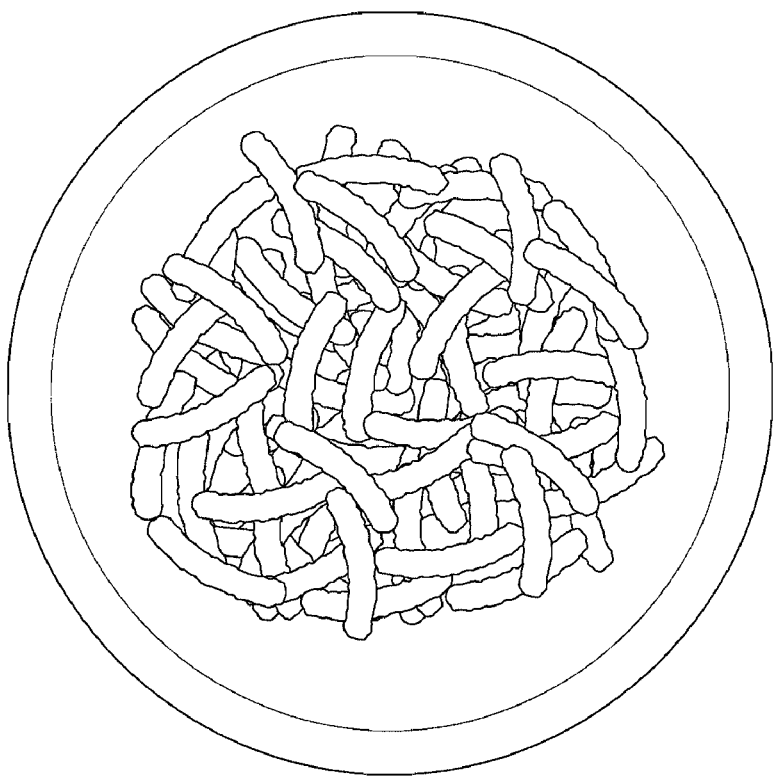

The development of the agglomerate involved testing a variety of materials for the ability to form the agglomerate using scalable laboratory techniques, testing the physical characteristics of the resulting agglomerates, and testing the interaction of the activated carbon and other agglomerate additives. Agglomerates were developed with the following properties: dense sediment, dense enough to be resistant to re-suspension over the period it takes to be worked into the sediments, and able to break down to release active agents over the period of days to weeks. The most promising formulation was made of powdered activated carbon, bentonite clay, and sand as shown in FIG. 2, and was produced in larger quantities for use in biological tests. Preferably the agglomerate is formed into pellet shapes of approximately 1 mm to 15 mm in diameter. The pellets are preferably oblong or substantially spherical but may conceivably take other compact shapes and may conceivably be up to about 100 mm in length.

The prepared sorbent pellets were tested for friability by placing in a glass bottle and rolling at four rpm for one hour in a roller. This test was used to compare the friability of the pellets made using different formulations of binders. The amount of fines produced was to be measured by sieving through a 1 mm sieve and weighing the fines. The amount of fines produced form the different formulations tested are shown in Table 1. As shown in Table 1, the percent fines produced after one hour of tumbling was about 1% or less for the four formulations tested. The use of cellulose reduced the fines to less than 0.1%. Bentonite was shown to be important as a binder because lowering the amount of bentonite raised the percentage of particles broken off.

TABLE 1

Results of pellet friability test.

| Pellet composition (%) | | | | Weight of pellets before (g) | Weight of sieved particles (g) | % of pellets sieved off (%) |
| --- | --- | --- | --- | --- | --- | --- |
| PAC | Bentonite | Sand | Cellulose | | | |
| 60 | 30 | 10 | 0 | 30 | 0.57 | 0.17 |
| 60 | 20 | 20 | 0 | 26 | 0.31 | 1.03 |
| 60 | 25 | 15 | 0 | 30 | 0.29 | 0.97 |
| 60 | 25 | 10 | 5 | 30 | <0.1 | <0.33 |

Figure 3:
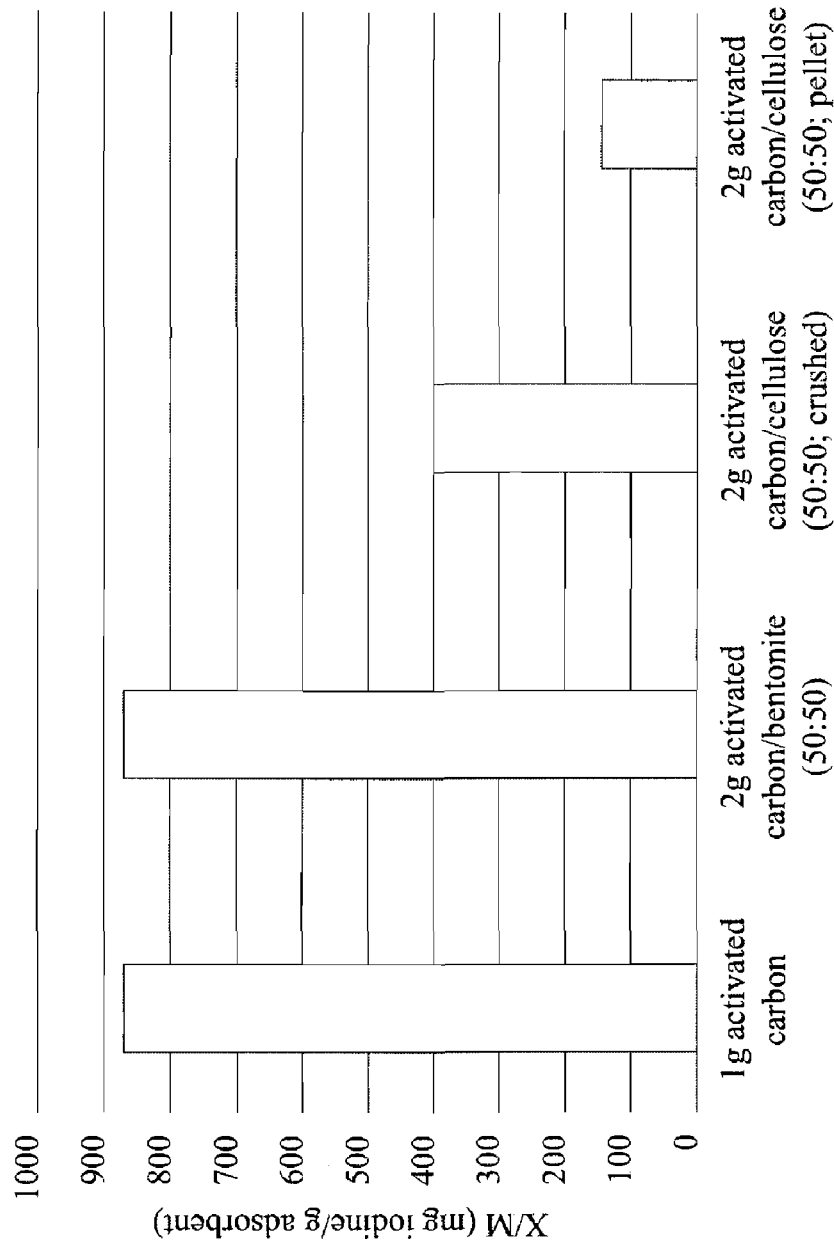
FIG. 3 is a schematic chart of Iodine Number Test Results showing milligrams of iodine adsorbed per gram of material.

Example: The iodine number test (ASTM D 4607) was used to determine if any of the binders or additives would render the activated carbon ineffective. The tests used the iodine as a surrogate for other organic chemicals, such as PCBs (polychlorinated biphenyls), which are common sediment contaminants. The results of the iodine number tests are shown in FIG. 3. The average amount (milligrams) of iodine adsorbed per gram of activated was 869 and 969 for one gram of activated carbon and two grams 50/50 of activated carbon/bentonite, respectively. These results indicate that bentonite does not interfere with the ability of activated carbon to adsorb iodine. The amount of iodine adsorbed was reduced when cellulose was used as a binder. The cellulose appears to produce a gel-like layer over the carbon that hinders mass transfer or sorbate, reducing the apparent effectiveness of the carbon. In a field application the cellulose will gradually degrade or wash away, exposing the sorbent materials slowly over time.

There was no observed sediment avoidance by the *Lumbriculus* worm. The worms immediately burrowed into the sediment when placed in the test chamber. A t-test was performed on the data, and there was no significant difference between the test group containing sediment and un-agglomerated activated carbon or the test group containing sediment and the agglomerate compared to the control group. The results indicate that the agglomerate does not pose a threat to benthic organisms.

Figure 4B:
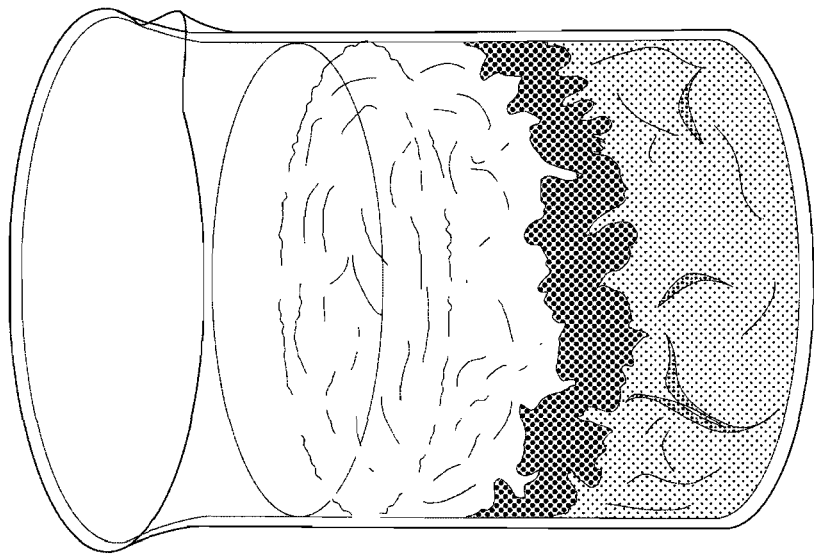
FIG. 4 is a photograph showing, on the left, the placement of a layer of powdered activated carbon/bentonite/sand pellet on Grasse River sediments and the, on the right, 3 days of activity of *L. variegates* that produced a layer of worm feces on top of the layer of pellets starting the process of slow incorporation of the amendment into the top layer of sediments.
Figure 4A:
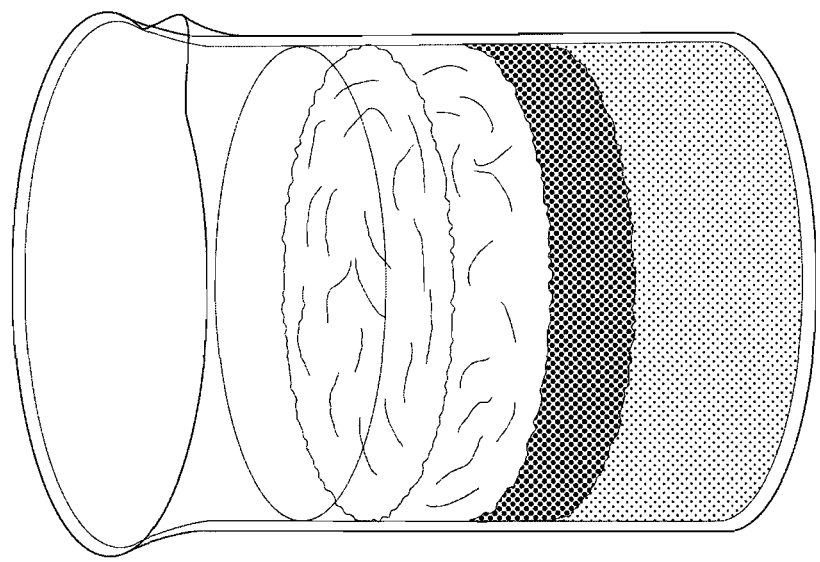

Example: Microcosm studies were conducted to evaluate the behavior of freshwater oligochaetes in sediment amended with activated carbon/bentonite/sand pellets. PCB-impacted sediment from Grasse River, N.Y. and the freshwater oligochaete *Lumbriculus variegates* were used in these studies. Sediment (100 ml) and oligochaetes (25) were placed in 400 ml glass beakers in triplicate. The control beakers contained sediment only and the treatment beakers had sediment covered with pellets at a does to achieve 2.5% activated carbon based on sediment dry weight. We observed active breakdown of the new pellets by the worm bioturbation activity. After just three days of introducing the worms, the top layer was covered with excreted sediments and the amendment material from the pellets was integrated into the sediment layer. After one month of worm activity the new sediment treatment pellets were not distinguishable and the carbon delivered with the new pellets was integrated into the top two inch layers of sediment. FIG. 4 shows the surface of sediment with pellets before the addition of the oligochaetes and after 3 days of bioturbation. A close-up image of the sediment profile shown in FIG. 4 illustrates the process of the breakdown of the pellets and incorporation into the bioactive layer of freshwater sediments.

Figure 5:
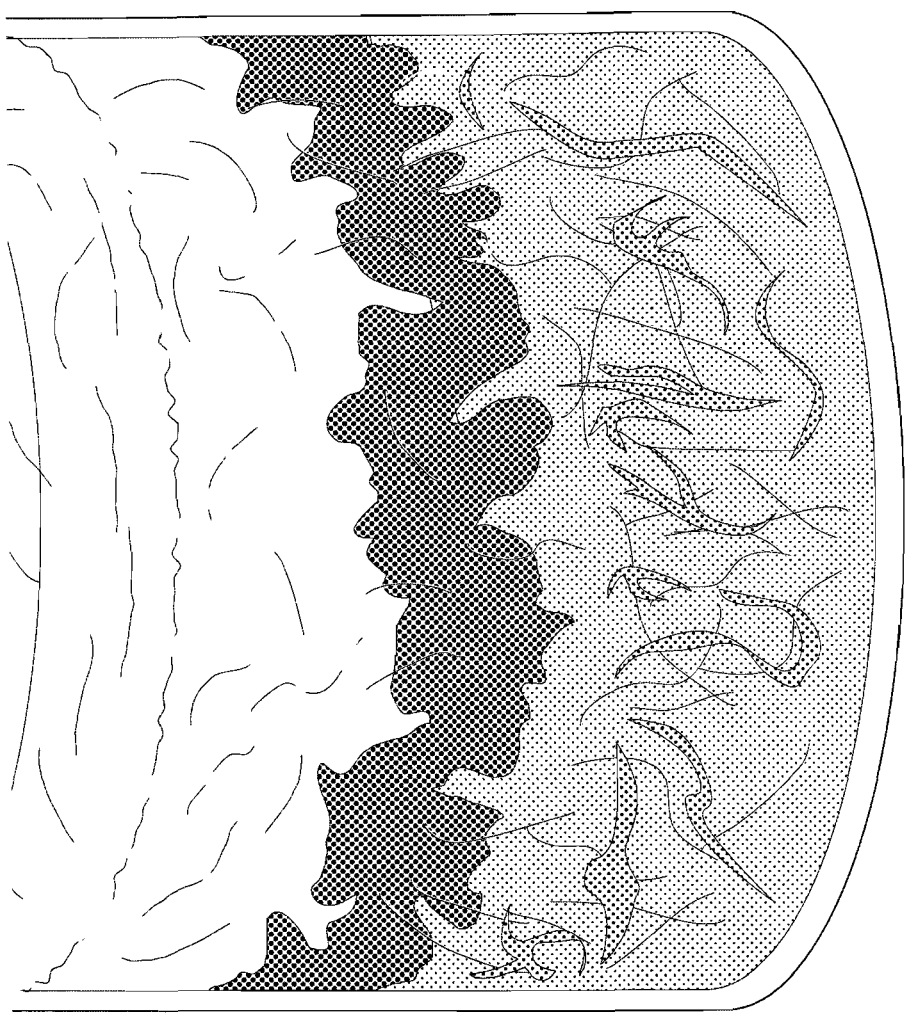
FIG. 5 is a close-up image of the sediment profile showing the buildup of worm feces (in 7 days) on top of the amendment pellets and the slow incorporation of the pellet materials through the worm burrows.

Example: The process of bioturbation is illustrated in FIG. 5 showing the buildup of worm feces on top of the added pellets on the sediment surface. To evaluate mixing, a fluorescent tracer material was incorporated into the agglomerate. The experiment was designed to test the ability of benthic organisms to mix the agglomerate and associated treatment materials into sediment by bioturbation (i.e. through natural movement and sediment irrigation processes).

The experiment was modeled after a 28-day bioaccumulation test, and included: three large (approximately 50 gallon) tanks containing ten inches of sediment with a natural benthic community enhanced with both the estuarine amphipod *Leptocheirus* and polyuchaete *Nereis*, and; three standard (approximately 20 gallon) size tanks with sieved natural sediment for the experimental control. Sieving removes the invertebrates responsible for most of the sediment mixing via bioturbation processes.

The sediments used in the experiment were collected from the Wye River in Queen Annes County, Md. The Wye River is relatively clean of contamination, and is used as referenced sediment. Special agglomerates containing 5% by weight of a fluorescent tracer material were prepared for the experiment. The fluorescent tracer allows for the movement of the agglomerate materials through sediment by bioturbation to be evaluated by fluorescence imaging of the sediment illuminated with an ultraviolet lamp.

Figure 6:
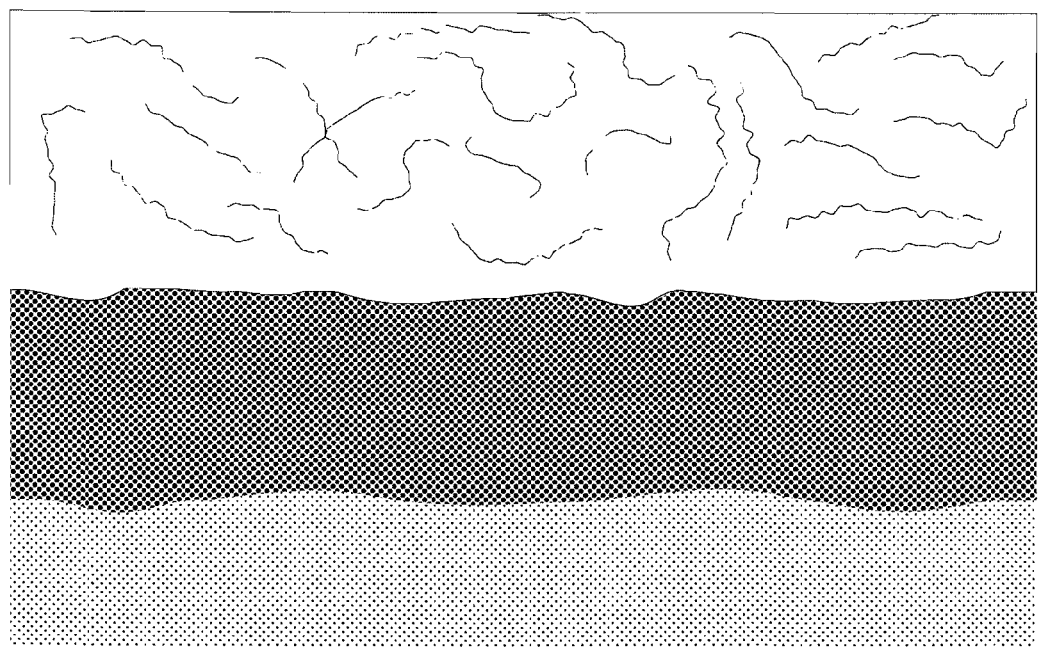
FIG. 6 is a photograph taken with ultraviolet light showing bioturbation test control tank on Day 28, illustrating that marine sediments without organisms show no mixing of the added fluorescent-tagged pellets into the sediment layer.
Figure 7:
FIG. 7 is a photograph of a bioturbation test activation tank on Day 28 illustrating that marine sediment with *Leptocheirus* and *Neris* shows mixing of the added fluorescent-tagged pellets into the top two inches of sediment. The scale at the left side of the photograph shows sediment depth in inches.

The agglomerates with the tracer were applied to the sediment surface of the test tanks and allowed to sit for 30 days. Observations were taken at the start of the experiment and repeated weekly. FIGS. 6 and 7 show representative pictures of the control and active bioturbation test tanks under fluorescence at day 28 of the experiment, respectively. The tank shown in FIG. 6, with an active benthic community, shows the incorporation of the fluorescent-tagged amendment into the top several inches of the sediment. The amendment materials delivered with the new treatment pellets was carried into the worm burrows and integrated into the sediment top layer through the bioturbation activity of the worms. Thus, delivery of sediment amendments in the form of the new pellets and allowing benthic organism activity to mix the amendment pellets is a more efficient method of delivering the amendments to the locations they are most needed, which is the natural habitat of the base of the aquatic food chain.

Example: The effect of activated carbon delivered to sediment with and without the use of the new amendment pellet technology was tested using freshwater sediments impacted with polychlorinated biphenyls (PCBs). The study sediment was obtained from Grasse River, N.Y., that has been impacted with PCBs from historic industrial activities. A freshwater oligochacte, *L. variegates*, was used as a test organism to measure bioaccumulation of PCBs. The bioaccumulation study was based on the USEPA Methods for Measuring the Toxicity and Bioaccumulation of Sediment-Associated Contaminates with Freshwater Invertebrates. The experiment was set up in 250 ml glass beakers containing approximately 100 ml of wet sediment and about 0.5 g of worms. The control experiment received sediment with no treatment materials. The first treatment involved placing a layer of activated carbon (approximately 2% by dry weight of sediment) on the top of the sediment without mixing. The second treatment involved placement of the same amount of activated carbon (about 2%) in the form of the new treatment pellets.

Figure 8:
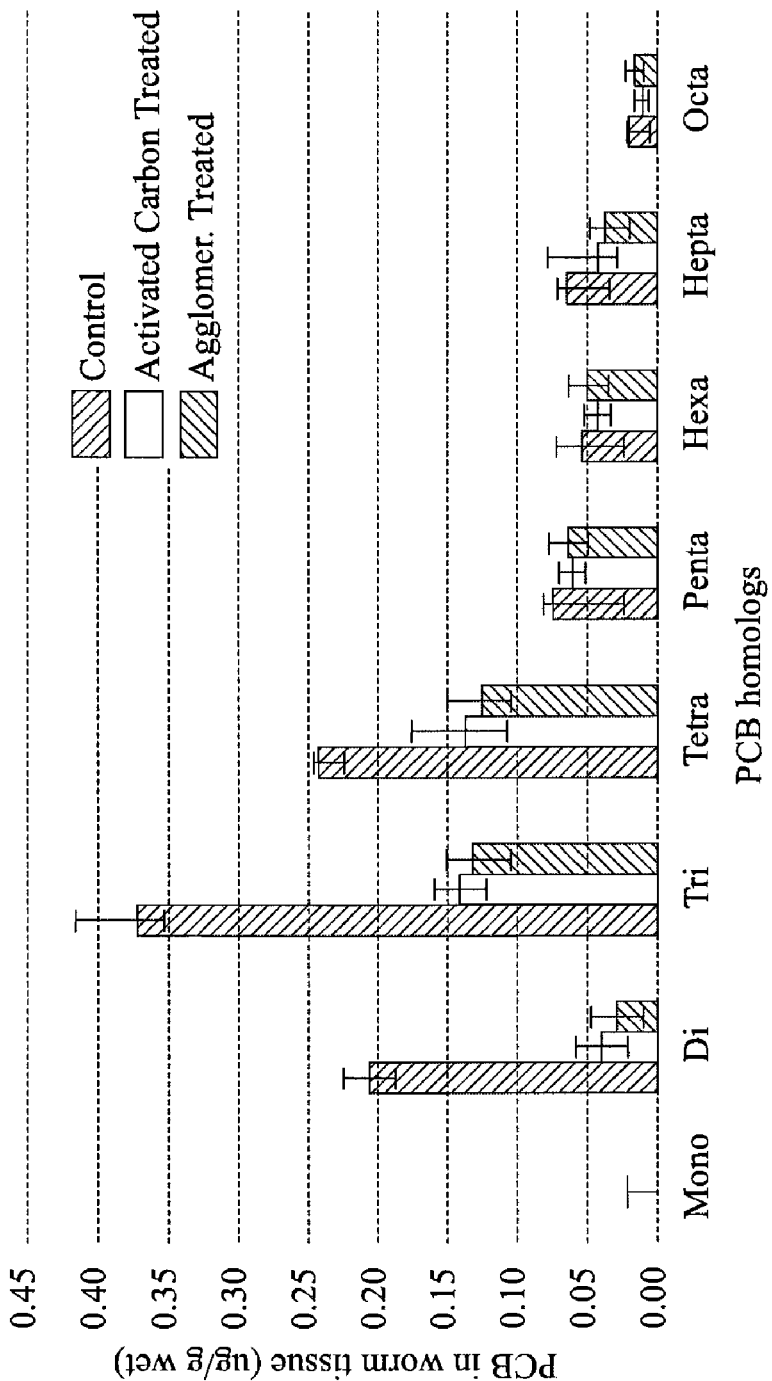
FIG. 8 is a chart illustrating the reduction of PCB bioaccumulation in benthic organisms after amendment of sediment with 2% activated carbon delivered with and without the use of the new amendment pellet technology. The results indicate that packaging of the carbon into the new pellets does not adversely impact the reduction of PCB bioaccumulation in benthic organisms.

Each of the two treatments and the control experiment had five replicate beakers. The amendments were allowed to remain on the sediment for a week before the introduction of the worms. The worms were exposed to the treated or untreated sediments for 28 days. At the end of the exposure period, the worms were removed from the sediment, depurated for 8 hours, weighed, and extracted for analysis of PCB residue in the tissue. As shown in FIG. 8, there was a significant reduction of PCB bioaccumulation in the worms in the treated samples, especially for the mono through pentachlorobiphenyls. Total PCB bio-uptake reduction was 54% for the activated carbon treated sediment and 56% for the case where activated carbon was delivered as the new pellets. There is no statistical difference between the application of activated carbon with and without the use of the new pellet technology. The results indicate that packaging of the carbon into the new pellets does not adversely impact the reduction of PCB bioaccumulation in the organism. The effectiveness of the application is expected to improve with longer contact of the amendments with contaminated sediment.

FIG. 8 illustrates a reduction of PCB bioaccumulation in benthic organisms after amendment of the sediment with 2% activated carbon delivered with and without the use of the new pellet technology. The results indicate that packaging of the carbon into the pellets does not adversely impact the reduction of PCB bioaccumulation in the organisms.

The average cost of PCB contaminated sediment remediation based on dredging and disposal carried out at nineteen areas of concern in the Great Lakes basin is approximately $187 million. A higher cost of about $256 million is expected for the dredging and disposal of PCB contaminated sediment in the ongoing Hudson River cleanup effort. Assuming a typical dredging depth of three feet, the remediation cost per square yard is approximately $200.

It is anticipated that for the new amendment pellet approach the application cost will be small due to the lack of sediment handling, transport, and disposal costs. The main cost in our approach will be the material cost of the amendments to the pellets. The material cost for powdered activated carbon is approximately $1/pound and even less for regenerated carbon. It is further anticipated that forming into pellets may increase the cost to about $2/pound. The application rate based on our previous work is typically in the range of three to five pounds per square yard, to remediate the top six inches of sediment that comprises the bioactive zone. Thus, with our approach, the sediment remediation cost is in the range of $10 per square yard, which is less than an order of magnitude compared to traditional dredging costs. The cost of field application of the proposed technology is expected to be low primarily because of the low cost of the sorbent material and because this is an in situ process not involving any sediment relocation. Thus, a rough estimate of the material costs for the stabilization process is very attractive. The material cost compares very favorably with the cost of currently used disposal options.

Accordingly it will be understood and appreciated that the present approach is a highly desirable, cost-effective delivery of sediment amendments and utilization of natural processes to achieve mixing of the amendments in the bioactive zone in the sediments. We have also herein disclosed a new approach in the manipulation of material properties of the amendment pellets to achieve efficient delivery through a water column and controlled breakdown of the amendments while maintaining effectiveness in sediment remediation.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting.

Thus, the breadth and scope of the present invention should not be limited by any of the above-described exemplary embodiments, but should be defined only in accordance with the following claims appended hereto and their equivalents. As examples only, and not limitations, possible variations in the new system can include: i. use of different types of sorbent amendment materials for organic and metal contaminants; ii. use of different types of reactive amendment materials; and iii. use of different types of biologically active amendment materials.

What is claimed is:

1. A method of treating contaminated sediments beneath a body of water comprising:
    providing a sorbent and a binder;
    agglomerating said sorbent and said binder into particles;
    said particles being dense enough to sink in water without re-suspension in the water of said sorbent;
    said particles breaking down in sediment beneath the body of water under only the influence of bioturbation;
    distributing said agglomerate particles on the surface of a body of water over contaminated sediment whereby said sorbent is exposed to contaminants in the sediment, beneath the water.

2. The method of claim 1 further comprising agglomerating a dense element in said particles.

3. The method of claim 2 further comprising said dense element being sand.

4. The method of claim 1 further comprising said sorbent being activated carbon.

5. The method of claim 1 further comprising said binder being bentonite.

6. The method of claim 1, wherein said particles contain about 30% to about 80% sorbent.

7. The method of claim 1, wherein said particles contain about 10% to about 30% bentonite clay.

8. The method of claim 1, wherein said binder is bentonite clay, said sorbent is powdered activated carbon and said bentonite clay does not inhibit the ability of said powdered activated carbon in the agglomerate to absorb iodine.

9. The method of claim 1, wherein the particles contain about 60% powdered activated carbon, about 20% bentonite clay and about 20% sand.

10. The method of claim 1, wherein the particles contain about 0% to about 40% sand.

11. The method of claim 1, and further comprising a binder having negligible toxicity to the benthic organisms so as to be suitable for repeat application to the same water column is desired.

12. The method of claim 1, further comprising adding cellulose to said particles.

13. The method of claim 1, further comprising said break down of said agglomerate delivering said sorbent to a bioactive zone of sediment for sorption of contaminants.

14. The method of claim 1, and further comprising said agglomerate producing no more than one percent by weight of fines when rolling the agglomerate for one hour at four rpm.

15. The method of claim 1, wherein said particles are formed in the size range of about 1 mm to about 15 mm in diameter.

16. The method of claim 1, wherein said particles have a length of up to about 100 mm.

17. The method of claim 1 further comprising said particles having a consistency of about 55% powdered activated carbon, about 25% bentonite, about 15% sand and about 5% cellulose.

18. The method of claim 1 further comprising said particles having a consistency of about 60% powdered activated carbon, about 20% bentonite and about 20% sand.

19. The method of claim 1 further comprising said sorbent treating metal contaminants from the sediment.

20. The method of claim 1 further comprising said sorbent treating organic contaminants from the sediment.

21. The method of claim 1 wherein said sorbent is exposed to contaminants in a benthic zone of the sediment wherein mixing by bioturbation takes place.

22. The method of claim 1 wherein said particles have a density insufficient to penetrate bottom sediment after sinking so that they are available to be mixed by bioturbation.

23. The method of claim 1 wherein said particles settle on a surface of the sediment.

24. The method of claim 1 wherein said sorbent is exposed to contaminants in a biologically active zone of the sediment, i.e. the zone where bioturbation occurs.

25. The method of claim 24 wherein said biologically active sediment zone is substantially about 6 inches deep.

26. The method of claim 24 wherein said biologically active sediment zone is substantially about 2 inches deep.

27. The method of claim 23 wherein said particles form a light, non suffocating and temporary layer on the sediment and is broken down and mixed by bioturbation.

28. The method of claim 1 further comprising a biological assessment step followed by a step of estimating a loading rate.

29. The method claim 12 wherein said cellulose acts as a degradable binder to hold the pellet together during application.

30. The method of claim 1 wherein said particles are pellets.

31. The method of claim 1 wherein said particles sink to region where bioturbation occurs.

* * * * *